United States Patent

Ramsay

Patent Number: 6,036,933
Date of Patent: Mar. 14, 2000

[54] CALCIUM CARBONATE PRECIPITATION METHOD

[75] Inventor: James Ian Ramsay, Randburg, South Africa

[73] Assignees: Pretoria Portland Cement Company Limited, Johannesburg; John Edward Gomersall, Sandton, both of South Africa

[21] Appl. No.: 08/894,881

[22] PCT Filed: Mar. 1, 1996

[86] PCT No.: PCT/GB96/00488

§ 371 Date: Oct. 22, 1997

§ 102(e) Date: Oct. 22, 1997

[87] PCT Pub. No.: WO96/26902

PCT Pub. Date: Sep. 6, 1996

[30] Foreign Application Priority Data

Mar. 2, 1995 [ZA] South Africa ............ 95/1727

[51] Int. Cl.[7] .......................................... C01F 5/24
[52] U.S. Cl. .......................................... 423/430; 423/432
[58] Field of Search .................... 423/430, 432

[56] References Cited

U.S. PATENT DOCUMENTS 2,535,999  12/1950  Bouchard ............................. 106/286

FOREIGN PATENT DOCUMENTS

| 499 666 A1 | 8/1992 | European Pat. Off. . |
| 558 275 A1 | 9/1993 | European Pat. Off. . |
| 1 011 861 | 7/1957 | Germany . |
| WO 79/00931 | 11/1979 | WIPO . |
| WO 96/26901 | 9/1996 | WIPO . |

OTHER PUBLICATIONS

Zou et al., "Manufacture of Magnesium Oxide and Calcium Carbonate", *Chem. Abstracts.*, 116:26, 178, abstract No. 258510h, Oct. 1991.

Dmitrievskii et al., "Manufacture of Calcium Carbonate" *Chem. Abstracts*, 114:6, 175, abstract No., Feb. 45999w (1991).

*Primary Examiner*—Steven P. Griffin
*Assistant Examiner*—Staurt L. Hendrickson
*Attorney, Agent, or Firm*—Nath & Associates; Gary M. Nath; Lee C. Heiman

[57] ABSTRACT

A method for producing precipitated calcium carbonate by reacting an aqueous solution of calcium nitrate $[Ca(NO_3)_2]$ with an aqueous solution of ammonium carbonate $[(NH_4)_2CO_3]$ and allowing calcium carbonate to precipitate from the resultant mixture containing nitrate $[NH_4NO_3]$ in the mother liquor, the process being characterized in that: (i) the calcium nitrate $[Ca(NO_3)_2)]$ solution utilized in the processes is prepared by slaking lime [CaO] in water in the presence of ammonium nitrate $[NH_4NO_3]$ to form calcium nitrate $[Ca(NO_3)_2]$ and ammonium hydroxide $[NH_4OH]$ in solution, filtering the solution to render it solids free, and heating the filtrate to dissociate the ammonium hydroxide $[NH_4OH]$ and to drive ammonia gas $[NH_3]$ from the solution; (ii) the ammonium carbonate $(NH_4)_2CO_3$ solution utilized is prepared by absorbing ammonia gas $[NH_3]$ and carbon dioxide gas $[CO_2]$ in water, the ammonia gas preferably being derived from the step in (i) above in which the $Ca(NO_3)_2$ solution is heated; and (iii) the ammonium nitrate used is derived from the precipitation phase during which calcium carbonate is precipitated from the mother liquor containing ammonium nitrate.

13 Claims, 1 Drawing Sheet

CALCIUM CARBONATE PRECIPITATION METHOD

FIELD OF THE INVENTION

This invention relates to methods for producing crystalline materials by precipitation. According to one aspect of the invention it relates to the production of precipitated calcium carbonate. The invention thus relates particularly, but not exclusively, to the production of high purity calcium carbonate from relatively impure calcium source material.

BACKGROUND TO THE INVENTION

Calcium carbonate is a natural carbonate which is present in large quantities particularly in calcitic and dolomitic limestone. In raw impure form these products are used in various industries including the mining and cement industries. In purified crystalline form calcium carbonate is used in the production of paint, in toothpaste, paper coating and sizing and as an acid neutraliser or as a filler in pharmaceutical products, amongst other applications.

Despite the natural abundance of calcium carbonate as such pure calcium carbonate is a relatively expensive product due to the difficulties and expenses associated with conventional purification methods.

OBJECT OF THE INVENTION

It is an object of the present invention to provide a new method for producing precipitated calcium carbonate from a natural source material containing calcium values.

EP-A-49666 [Kalk Chemische Fabrik] teaches the preparation of calcium carbonate [vaterite] by reaction of a calcium ion containing aqueous solution with carbonate ions containing aqueous solution. Preferred are the use of a solution containing calcium nitrate and a solution of ammonium carbonate.

Chemical Abstracts, AN: 116:258510H of CN-A-1055718 [Zou et al] discloses the preparation of calcium nitrate from calcined [dolomite] ores [i.e. lime] by impregnation of the calcination product with ammonium nitrate solution. The resultant calcium nitrate solution is used for the preparation of calcium carbonate by carbonisation with $CO_2$-containing air.

WO-A-7900931 [Anderson] discloses a process for the preparation of white liquor for the sulphate pulping process, wherein quicklime is slaked with green liquor and the slaked lime formed is reacted with the sodium carbonate in the green liquor to sodium hydroxide in a causticizing process, the lime sludge formed being separated. According to that invention, the process from the slaking of the lime up to the separation of the white liquor and the lime sludge is carried out at a pressure above the atmospheric pressure. In a preferred embodiment, the process is also carried out at a temperature above the normal boiling temperature of the system.

SUMMARY OF THE INVENTION

According to the invention there is provided a method for producing precipitated calcium carbonate by reacting an aqueous solution of calcium nitrate $[Ca(NO_3)_2]$ with an aqueous solution of ammonium carbonate $[(NH_4)_2CO_3]$ and allowing calcium carbonate to precipitate from the resultant mixture containing nitrate $[NH_4NO_3]$ in the mother liquor, the process being characterised in that

[i] the calcium nitrate $[Ca(NO_3)_2]$ solution utilised in the processes is prepared by slaking lime [CaO] in water in the presence of ammonium nitrate $[NH_4NO_3]$ to form calcium nitrate $[Ca(NO_3)_2]$ and ammonium hydroxide $[NH_4OH]$ in solution, filtering the solution to render it solids free, and heating the filtrate to dissociate the ammonium hydroxide $[NH_4OH]$ and to drive ammonia gas $[NH_3]$ from the solution;

[ii] the ammonium carbonate $(NH_4)_2CO_3$ solution utilised is prepared by absorbing ammonia gas $[NH_3]$ and carbon dioxide gas in water, the ammonia gas preferably being derived from the step in [i] above in which the $Ca(NO_3)_2$ solution is heated;

[iii] the ammonium nitrate used is derived from the precipitation phase during which calcium carbonate is precipitated from the mother liquor containing ammonium nitrate.

The precipitation reaction between the two reagent solutions which react to form the precipitated $CaCO_3$ is preferably performed by feeding the solutions into intimate contact with one another in a contact zone of a reactor arrangement and immediately displacing the mixture from the contact zone, and allowing the resultant crystalline reaction product to precipitate from its mother liquor and separating the precipitated crystals from the mother liquor.

In a preferred form of the invention the reagent solutions are introduced into a reactor arrangement which is in the form of an elongated tubular conduit into which the reagent solutions are fed under a pressure of between 1 and 5 bar gauge pressure. It has been found that the application of feed pressure in this range results in a decrease in crystal particle size.

In one application of this aspect of the invention there is thus provided a method for selectively producing precipitated calcium carbonate crystals in which a preferred crystal size distribution predominates, the method comprising the steps of intimately contacting an aqueous solution of $Ca(NO_3)_2$ with an aqueous solution of $(NH_4)_2CO_3$ whilst controlling the pressure of the reaction to remain within a range at which the formation of the required particle size and distribution of the $CaO_3$ crystals is favoured, allowing the resultant crystalline reaction product to precipitate from its mother liquor and separating the precipitated crystals from the mother liquor.

The method may be used to produce precipitated calcium carbonate which is predominantly of the vaterite crystalline form which has been found to be the default crystalline form when the temperature was kept between 15° C. and 75° C. The reaction is for this purpose most preferably carried out at between 34° C. and 40° C.

With residence in slurry form the vaterite crystal form has been found to convert into calcite and is known in the art.

According to a further aspect of the present invention there is provided a method for producing precipitated calcium carbonate crystals of a selected crystal size comprising the steps of reacting an aqueous solution of calcium nitrate with an aqueous solution of ammonium carbonate and controlling the crystal size of the precipitated calcium carbonate by providing at least one of the reagent solutions at a concentration favouring the formation of the desired crystal size, allowing the resultant crystalline reaction product to precipitate from its mother liquor and separating the precipitated crystals from the mother liquor.

Such concentration control for influencing crystal size may of course be combined with reaction pressure control as described above.

In one embodiment of this aspect of the invention it has been found that by reacting 20% [by mass] solution of $Ca(NO_3)_2$ with a stoichiometric equivalent quantity of $(NH_4)_2CO_3$ it is possible to produce calcium carbonate crystals having a $d_{50}$ value of less than 6 microns, and that an increase in the concentration of the $Ca(NO_3)_2$ leads to the formation of finer crystals.

The various aspects of the invention will now be illustrated with reference to the accompanying examples:

EXAMPLES OF THE INVENTION

Example 1

Selective Preparation of Different $CaCO_3$ Crystalline Forms

[a] Preparation of Stock Solutions

50 Kg $NH_4NO_3$ was dissolved in 120 liters water with stirring, to which was added 17.5 kg lime sourced from Lime Acres in South Africa. 100 ml of triethanolamine was added to the dissolved $NH_4NO_3$ before the addition of the lime. The mixture was filtered to remove undissolved solids. The clear $Ca(NO_3)_2/NH_4OH$ filtrate was transferred to a separate vessel and heated to a temperature of 80° C. and held at 80° C. for 30 minutes to drive off ammonia gas. [Care must be taken to ensure the pH of the $Ca(NO_3)_2$ solution remains above 9.5].

A solution of approximately 10% $(NH_4)_2CO_3$ was prepared in 100 liters of water by absorbing $NH_3$ [released by heating the filtered $Ca(NO_3)_2/NH_4OH$ solution as described above] and pure $CO_2$ gas in the water in an absorbtion column.

The stock solutions of $Ca(NO_3)_2$ and $(NH_4)_2CO_3$ as prepared above were used to demonstrate the invention.

It will be appreciated that the ammonium carbonate solution may in the alternative have been prepared by feeding ammonia gas from another source with $CO_2$ gas into a scrubber arrangement to absorb such gases in water thereby to render a solution of ammonium carbonate.

[b] Influence of Reaction Pressure

The stock solutions prepared as described above were fed by means of constant displacement pumps at various pressures into an elongated reaction chamber of about 5 m in length. It was found that the pressure in the reaction chamber, which was controlled by means of a valve at the outlet end thereof, had a marked influence on the size of the crystals of $CaCO_3$ formed by the reaction between the concentrated stock solutions. Reaction temperatures were measured by determining the temperature of the final reaction slurry at the end of the reaction chamber. The results of typical pressure and temperature influences on crystal size are summarised in Table 1, the crystal size values being the $d_{50}$ values in microns.

TABLE 1

Effect of Pressure:

| REACTION TEMPERATURE | GAUGE PRESSURE [BAR] | | |
|---|---|---|---|
| | 0 | 3 | 5 |
| 17° C. | ND | 2.44 | 1.86 |
| 50° C. | 7.27 | 2.38 | 2.38 |

It will be seen that changes in reaction pressure affects particle size and distribution specifically, pressure above zero bar reduces particle size and narrows distribution.

BRIEF DESCRIPTION OF THE DRAWINGS

The tightening or narrowing effect of the present invention on particle size distribution is graphically illustrated in FIG. 1.

Figure 1A:
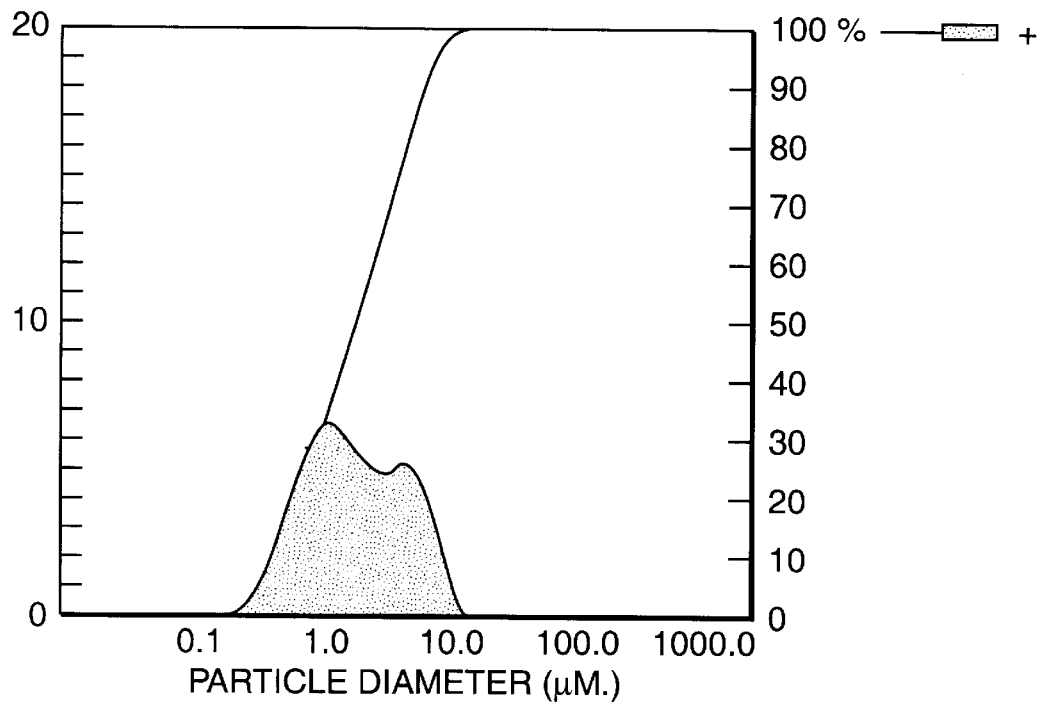
In FIG. 1 Graph A represents the particle size distribution and composition ranges for a commercially available ground calcium carbonate.
Figure 1B:
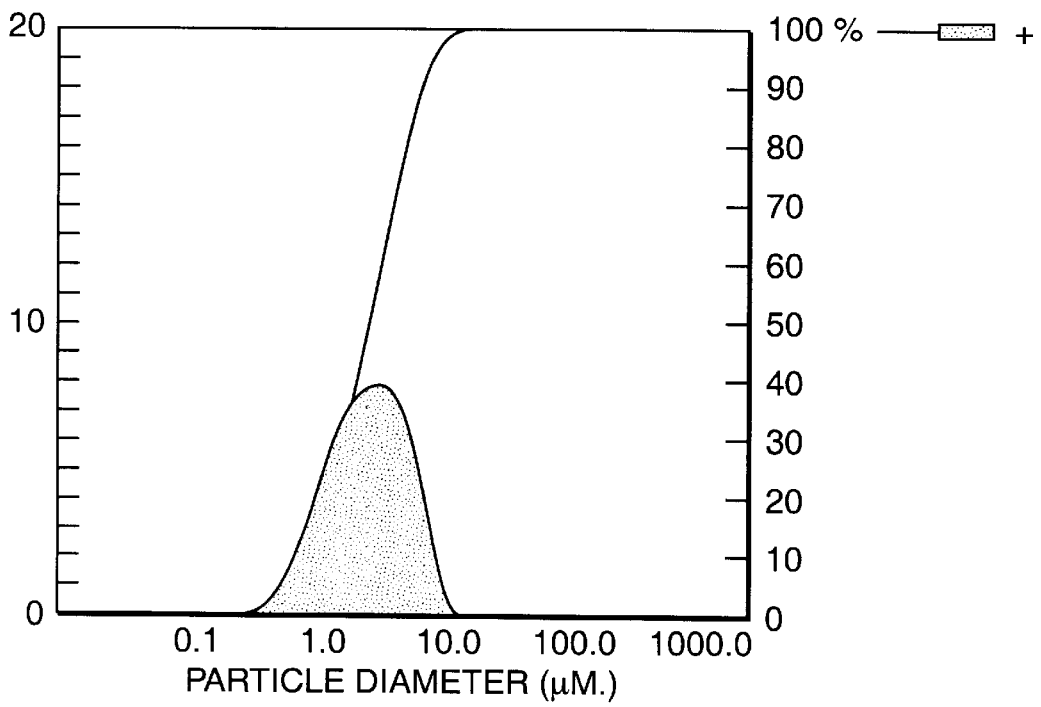

Graph B represents the same for a precipitated calcium carbonate produced by the method of the invention at 50° C. and 3 bar pressure.

It will be seen that the product of the method of the invention displays a sharper gaussian distribution of crystal sizes than the commercial product.

[c] Influence of Concentration of Feed Solutions

It has been found that increased concentration from 20% $Ca(NO_3)_2$ to 30% $Ca(NO_3)_2$ typically results in a decrease in mean particle size, e.g. $d_{50}$ 6 µm to $d_{50}$ 2 µm.

Example 2

The purity of the product produced by the method as described in Example 1[a] and [b] is extremely high and is in many respects comparable with the industry spectrographic standard for $CaCO_3$ marketed by Johnson Matthey. In Table 2 below the relative values for various impurities are compared against the Johnson Matthey standard [taking the quantities of impurities in such standard as being 1] and against two commercially available products identified as A and B.

TABLE 2

| | JM | A | B | Product of Invention |
|---|---|---|---|---|
| $SiO_2$ | 1 | 2,8 | 2,7 | 0,61 |
| $Al_2O_3$ | 1 | 1,1 | 2,5 | 0,67 |
| $Fe_2O_3$ | 1 | 2,2 | 3,5 | 0,83 |
| $Mn_2O_3$ | 1 | 1,16 | 1,37 | 1,08 |
| MgO | 1 | 19,8 | 17,7 | 1,03 |
| $P_2O_5$ | 1 | 1,15 | 0,47 | 1,09 |
| $SO_3$ | 1 | 0,97 | 0,89 | 2,65 |
| $Cl^-$ | 1 | 1,17 | 1,15 | 1,41 |
| $K_2O$ | 1 | 1,33 | 1,76 | 1,93 |
| $Nm_2O$ | 1 | 1,12 | 0,61 | 1,06 |

From the above table it will be seen that the product of the invention contains only 61% of the quantity of $SiO_2$ present in spectrographic grade $CaCO_3$ while other products in the market contain almost three times such amounts. For many of the other impurities similar observations may be made.

If one bears in mind that the process by which the product of this purity is achieved starts from very impure CaO, this achievement is remarkable.

I claim:

1. A method for producing precipitated calcium carbonate comprising the following steps:

(i) preparing an aqueous solution of calcium nitrate and ammonium hydroxide by slaking lime in water, in the presence of an aqueous ammonium nitrate solution;

(ii) rendering the solution of calcium nitrate and ammonium hydroxide solids-free;

(iii) heating the solids-free solution of calcium nitrate and ammonium hydroxide to dissociate the ammonium hydroxide and to drive ammonia gas from the solution, thereby producing an aqueous solution of calcium nitrate;

(iv) preparing an ammonium carbonate solution by absorbing ammonia gas and carbon dioxide gas in water;

(v) mixing the aqueous solution of calcium nitrate produced in step (iii) with the aqueous solution of ammonium carbonate produced in step (iv);

(vi) allowing calcium carbonate to precipitate from the mixture produced by the mixing of calcium nitrate with ammonium carbonate, as described in step (v), and thereby separating it from a resulting ammonium nitrate-rich mother liquor; and (vii) recycling the ammonium nitrate-rich mother liquor to step (i).

2. The method of claim 1, wherein step (v) is performed at a pressure of between 1 and 5 bar gauge pressure.

3. The method of claim 1, wherein the calcium nitrate and the ammonium carbonate are fed into intimate contact with one another in a contact zone of a reactor, and the mixture is immediately displaced from the contact zone, and wherein the resultant crystalline reaction product is allowed to precipitate from the ammonium nitrate-rich mother liquor and the precipitated crystals are thereafter separated from said mother liquor.

4. The method of claim 3, wherein the reagent solutions are introduced into a reactor which is in the form of an elongated tubular conduit.

5. The method of claim 4, wherein the particle size and size distribution is controlled by the use of pressure between 1 and 5 bar gauge pressure.

6. The method of claim 5, wherein the ammonia gas for step (iv) is derived from the step in (iii) above, in which the solids-free solution is heated.

7. The method of claim 1, wherein the ammonia gas for step (iv) is derived from the step in (iii) above, in which the solids-free solution is heated.

8. The method of claim 3, wherein the ammonia gas for step (iv) is derived from the step in (iii) above, in which the solids-free solution is heated.

9. The method of claim 4, wherein the ammonia gas for step (iv) is derived from the step in (iii) above, in which the solids-free solution is heated.

10. The method of claim 4, wherein the particle size and size distribution of the calcium carbonate produced by the process is controlled by controlling the concentration(s) of one or both of the solutions mixed in step (v) of the method.

11. The method of claim 10, wherein a 20 percent (by mass) solution of calcium nitrate is reacted with a stoichiometric equivalent quantity of ammonium carbonate to produce calcium carbonate crystals having a $d_{50}$ value of less than 6 microns.

12. The method of claim 10, wherein the ammonia gas for step (iv) is derived from the step in (iii) above, in which the solids-free solution is heated.

13. The method of claim 11, wherein the ammonia gas for step (iv) is derived from the step in (iii) above, in which the solids-free solution is heated.

* * * * *